(12) United States Patent
Dighe

(10) Patent No.: US 12,230,453 B2
(45) Date of Patent: Feb. 18, 2025

(54) REPLACEABLE AND SERVICEABLE MODULE FOR X-RAY GENERATING DEVICES

(71) Applicant: TRIAD National Security, LLC., Los Alamos, NM (US)

(72) Inventor: Kalpak Arvind Dighe, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 190 days.

(21) Appl. No.: 18/073,512

(22) Filed: Dec. 1, 2022

(65) Prior Publication Data

US 2023/0170152 A1    Jun. 1, 2023

Related U.S. Application Data

(60) Provisional application No. 63/284,908, filed on Dec. 1, 2021.

(51) Int. Cl.
   H01G 4/38    (2006.01)
   H01G 4/224   (2006.01)
   H05G 1/10    (2006.01)

(52) U.S. Cl.
   CPC ............ H01G 4/385 (2013.01); H01G 4/224 (2013.01); H05G 1/10 (2013.01)

(58) Field of Classification Search
   CPC .......... H01G 4/385; H01G 4/224; H01G 2/02; H01G 2/106; H01G 4/228; H01G 4/38; H05G 1/10; H05G 1/24
   See application file for complete search history.

(56) References Cited

U.S. PATENT DOCUMENTS 3,783,289 A * 1/1974 Hafner .................. H05G 1/24
                                                    378/103

* cited by examiner

Primary Examiner — Courtney D Thomas

(57) ABSTRACT

A device includes a first capacitive energy module and a second capacitive energy module. The first capacitive energy module comprises a first tray that is configured to house a first plurality of capacitive energy components, a first electrode, and a second electrode. The second capacitive energy module comprises a second tray that is configured to house a second plurality of capacitive energy components, a third electrode, and a fourth electrode. The first capacitive energy module is connected to the second capacitive energy module via a plug connector that makes a solid connection.

27 Claims, 16 Drawing Sheets

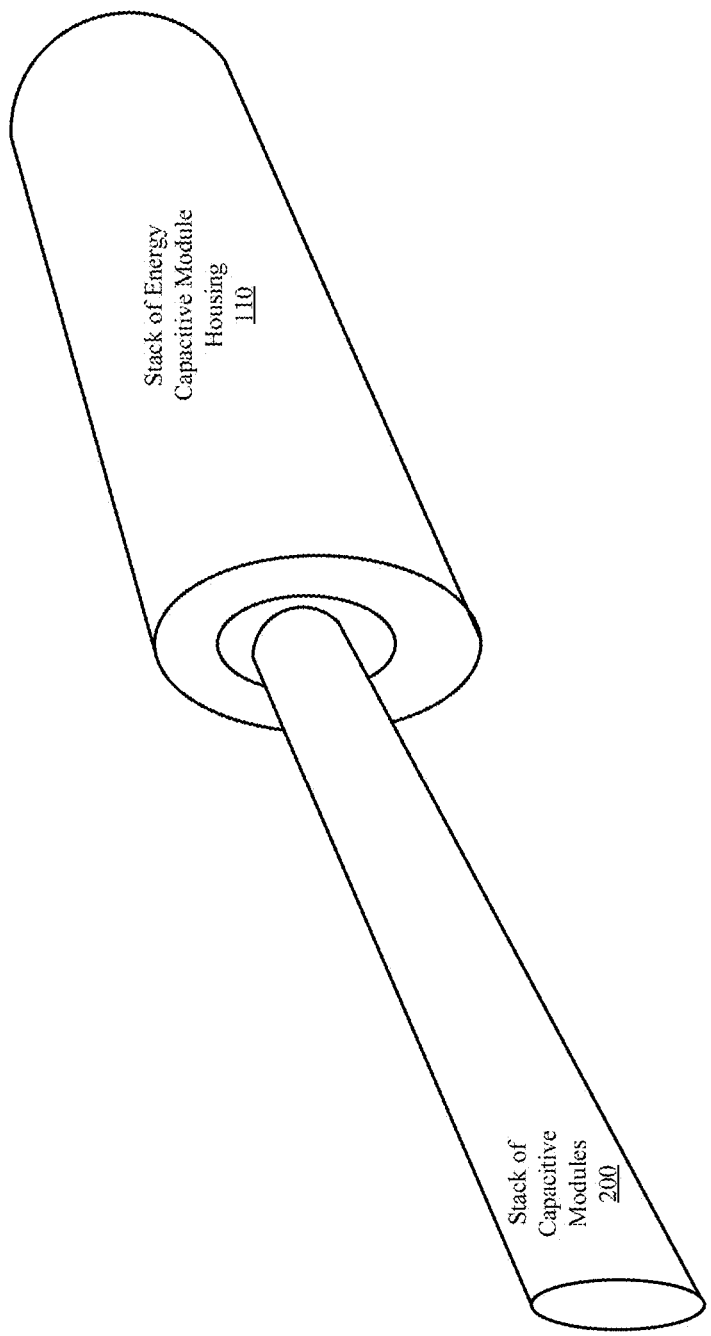

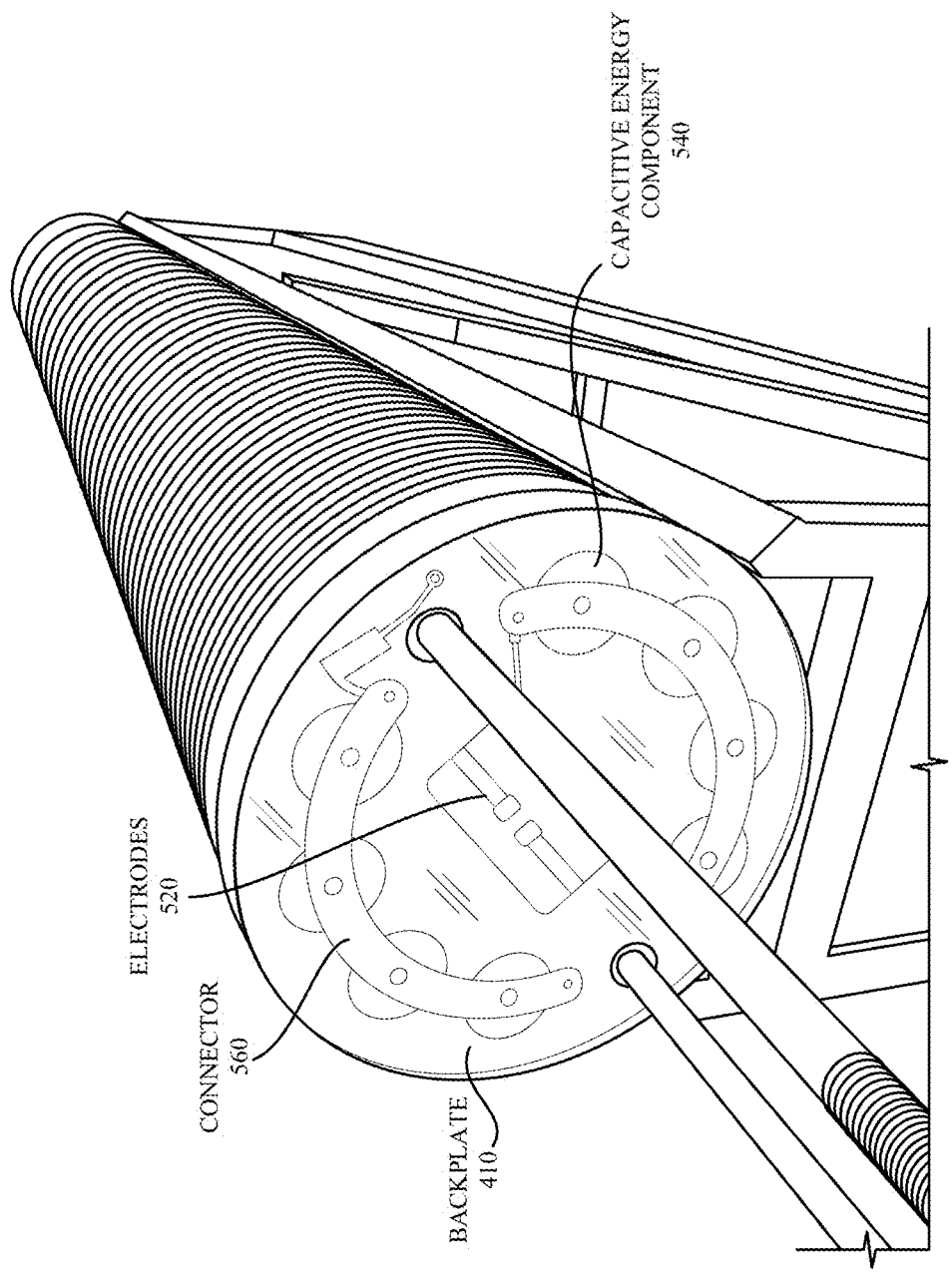

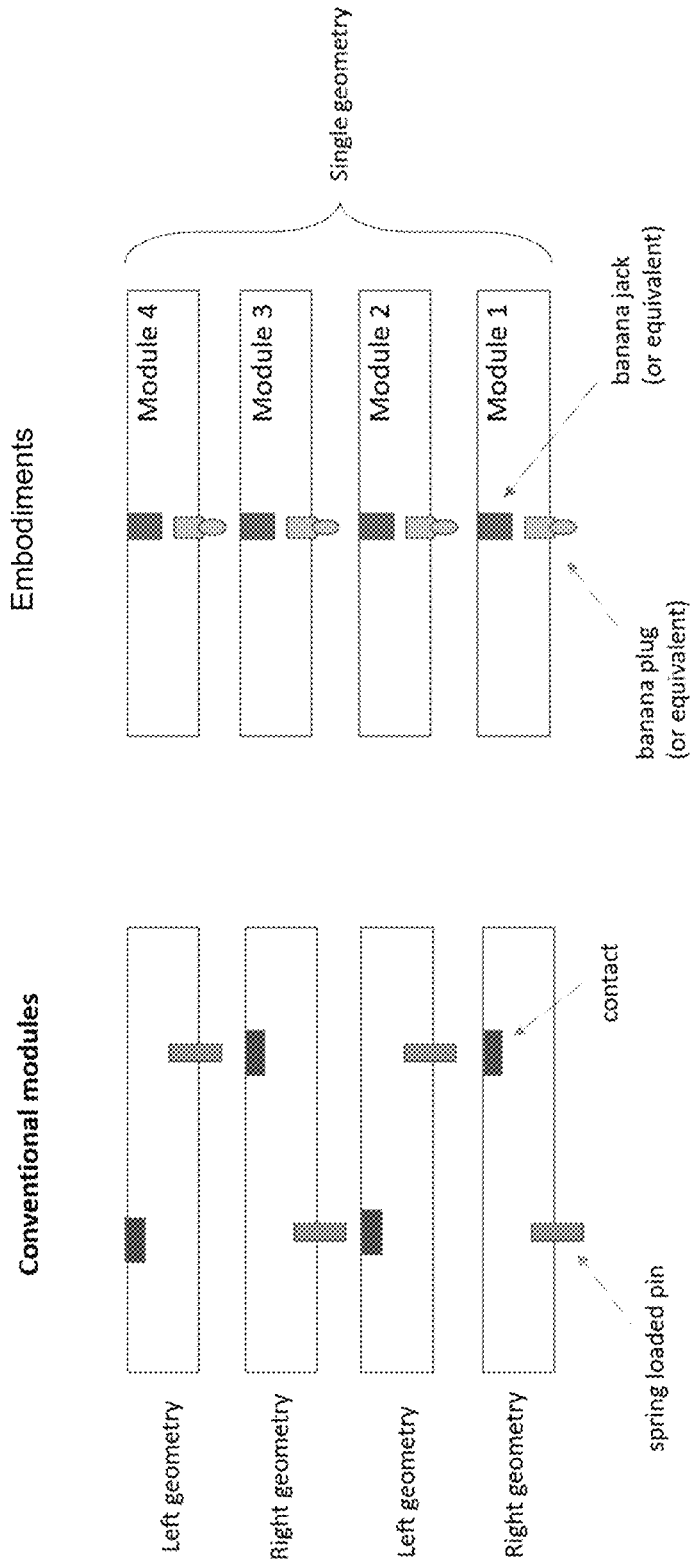

REPLACEABLE AND SERVICEABLE MODULE FOR X-RAY GENERATING DEVICES

RELATED APPLICATION

The instant application is a Nonprovisional U.S. patent application that claims the benefit and priority to the Provisional U.S. Application 63/284,908 that was filed on Dec. 1, 2021, which is incorporated herein by reference in its entirety.

ACKNOWLEDGMENT OF GOVERNMENT SUPPORT

This invention was made with government support under Contract No. 89233218CNA00000 awarded by the U.S. Department of Energy. The government has certain rights in the invention.

BACKGROUND

The use of X-rays has become prevalent in recent decades for different applications, e.g., flash radiography of high explosive events, measuring depth of penetration of ballistic munitions, studying impact of X-ray radiation on electronic components and electronic circuits to simulate space environment, as well as medical imaging of tissues and bone, etc. Some of these applications, such as flash radiography and radiation effect characterization, need higher X-ray outputs thus requiring higher voltage, e.g., 1 MV, 2.4 MV pulse power machines, while other applications such as medical imaging of tissue and bone require lower X-ray outputs thus requiring lower voltage, e.g., 100 kV, 300 kV pulse power machines. Regardless of the level of the X-ray output, a stack of capacitive energy modules is most often used to achieve the desired output.

Unfortunately, in conventional systems the individual components within the capacitive energy modules are sealed (e.g., epoxied), and as such when the system fails, the failed capacitive modules cannot be repaired and must be replaced, even if there is a pinhole size damage in the epoxy. Replacing the entire, damaged capacitive energy modules is monetarily and environmentally wasteful as the components are inaccessible for salvaging or recycling. Replacement of the entire stack of conventional modules takes approximately 12-14 months to manufacture, which implies a significant down time for the X-ray generating machine.

In order to generate X-rays, the energy stored in the capacitive module stack is discharged simultaneously (in series) to an anode-cathode gap, such as one contained in an X-ray beam tube, or in a rod-pinch configuration. In conventional systems, during the generation of high energy X-rays, this anode-cathode gap changes as the (1 mm diameter) anode needle ablates due to the high current passing through it. This changing gap length presents a variable impedance load and reflections of opposite polarity voltage are launched back towards the stack. These reflections are detrimental to the aging capacitive energy modules in the conventional system and are a major cause of their failure. As mentioned above, these failed modules of conventional systems cannot be serviced or repaired and must be discarded.

Conventional systems charge 80 modules (each with 2 stages) to 30 kV per stage, thus providing an output voltage of 2.4 MV into a matched load. In flash radiography experiments that image dynamic events, there is a need for higher energy X-rays than are currently available with conventional systems. This is true for experiments involving radiation effect characterization as well as other applications that require additional X-ray output dose on target. To overcome the limitation of conventional systems, the capacitive energy modules are often subjected to higher than rated charge voltages.

It is appreciated that the higher the output voltage, the higher (greater amplitude) the reflections and thus the greater likelihood of one or more modules being damaged and needing to be replaced.

SUMMARY

Accordingly, a need has arisen to create a stack of capacitive energy modules that is serviceable and repairable when one or more modules fails. As such, only the capacitive energy modules that have failed are repaired or replaced, while the unaffected modules can be reused. In other words, one or more failed modules may be serviced/replaced independent of other modules.

Moreover, a need has arisen to increase the output capacity of the stack of capacitive energy modules such that the stack of capacitive energy modules can be used for applications requiring increased X-ray dose, e.g., experiments requiring deeper X-ray penetration into thicker, high-Z material targets for imaging. Higher capacitive energy modules may be used in the stack by utilizing higher charge voltage and higher capacitance components for higher output while using the same form factor as the conventional system. It is appreciated that a stack of 70-74 of the modules used in embodiments may provide 30-35% more dose than 80 of the conventional modules. It is appreciated that in some embodiments of the proposed modules, fewer modules may be used to achieve the same output level as the conventional system, e.g., a stack of 55-60 modules may output the same level of X-ray dose as 80 modules of the conventional system, thereby reducing the length of the system. In some embodiments, a higher charge output may be achieved not only by using higher charge voltage and higher capacitance components but may also be achieved by using a two-stage electrode within a given capacitive energy module. Furthermore, a need has arisen to prevent capacitive energy modules from discharging their energies out of sequence which results in lower efficiency. In some embodiments, the electrodes in each capacitive energy module are positioned in a ladder configuration as opposed to linear configuration. In ladder configuration the distance between adjacent electrode pairs is less than the distance between adjacent electrode pairs when they are in a linear configuration. The closer distance ensures that adjacent electrode pairs discharge in sequence prior to causing the next capacitive energy module to discharge. As such, the output efficiency of the stack of capacitive energy modules is increased.

Moreover, a need has arisen to improve electrical connections between the capacitive energy modules. In some embodiments a banana plug connection between the capacitive energy modules may be used. This provides an improvement over capacitive energy modules in conventional systems which connect to the next module in the stack using spring loaded contacts. The spring-loaded contacts have a tendency to jam and do not provide solid electrical connection thereby causing electrical arcing. Over time, this arcing leads to pitting and corrosion between the pin and receptacle and renders a discontinuity during the charging process of the conventional system. Moreover, in the conventional system, the pins and receptacles are arranged in a 'left-right' geometry thereby requiring a damaged 'left' module to be replaced only by a 'left' module and a damaged 'right' module to be replaced only with a 'right' module. The 'left' and 'right' modules are physically incompatible and cannot be interchanged in the stack. In embodiments, the system incorporates the use of a plug (e.g., banana connector, hollow pin banana connector, bullet connector, spade connector, banana jack connector, etc.) and the corresponding receptacle to make a solid contact. Moreover, it is appreciated that the configuration of the plug and receptacle in adjacent modules have a single geometry, as opposed to a 'left' and 'right' orientation as is the case in conventional modules.

In some embodiments, the tray for the stack of capacitive energy modules may be manufactured from plastic material, e.g., Delrin® (an acetal homopolymer) or Acrylonitrile Butadiene Styrene (ABS), for ease of machining and excellent electrical insulating characteristics. High capacitive energy components, e.g., capacitors, are place in the recesses/pockets machined within the tray and may be connected to one another such that they discharge simultaneously to generate the high energy output, as desired. The capacitors may be connected to one another using a plate (e.g., a brass plate) or finger connectors (e.g., brass finger connectors) to make the electrical connections for charging/discharging. In some embodiments, a top plate connects the capacitive components for one polarity while a bottom plate connects the capacitive components for the opposite polarity. It is appreciated that the brass plates can be easily disconnected from the capacitors and thus enables servicing or replacing damaged capacitors during use. This is one distinguishing design feature from the conventional modules. In some embodiments, no more than two electrodes are used to connect all the capacitors within the same module, in comparison to using more than two electrodes in the conventional systems.

It is appreciated that in some embodiments of the proposed modules, high wattage resistors are used in the electrical charging and discharging path instead of bare, thin wire inductors that are used in the conventional system and are better suited than the inductors to withstand the reflection due to impedance mismatch caused by changing length of the output anode-cathode gap.

It is further appreciated that a need has arisen to prevent accidental breakdown of the dielectric medium between connection plates of the capacitive energy components. In some embodiments, the top and bottom connection plates or top and bottom connection strips may be positioned in an offset position with respect to one another, thereby preventing accidental breakdown of the dielectric medium, e.g., air, between the plates within the same capacitive energy module. It is appreciated that offsetting the top plate from the bottom plate increases the distance between the edges of the top and bottom plates with respect to one another, thus reducing arcing between the top plate and the bottom plate as they are held at opposite high voltage polarities.

These and other features and aspects of the concepts described herein may be better understood with reference to the following drawings, description, and appended claims.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 shows an example of a housing with a stack of capacitive energy modules according to one aspect of the present embodiments.

FIG. 7B shows an example of a stacked capacitive energy modules with strip connectors according to one aspect of the present embodiments.

FIGS. 10A and 10B show a conventional module and an example of 'single geometry' for the connectors and receptacles of the modules according to one aspect of the present embodiments respectively.

DETAILED DESCRIPTION

Figure 1A:
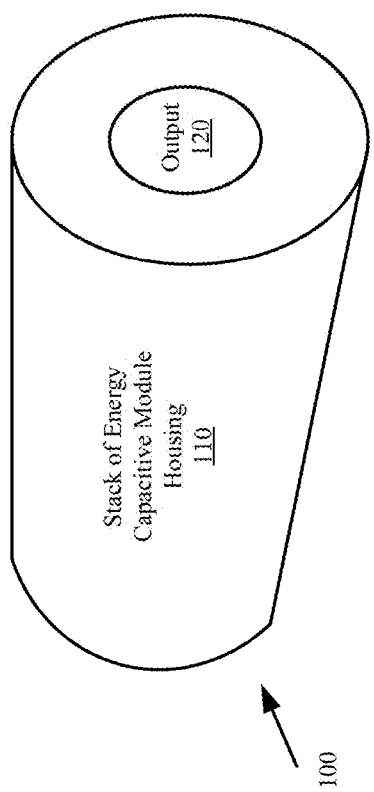
FIG. 1A depicts an example of a housing for capacitive energy modules according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

In some embodiments, the device may be a pulsed power machine and it may include a plurality of capacitive energy modules. To generate X-rays, the device includes a Marx bank (also referred to capacitor bank), with an output section that contains an anode-cathode gap in vacuum. It is appreciated that energy being discharged from the capacitor bank into the anode-cathode gap generates X-rays. Applications requiring higher X-ray dose that require higher output voltage, e.g., 2.4 MV, 1 MV, etc., may require more capacitive energy modules while lower X-ray dose that require lower output voltage, e.g., 100 kV, 450 kV, etc., may require fewer capacitive energy modules.

As described above, there is a need to create a stack of capacitive energy modules in X-ray generating devices that is serviceable and repairable when one or more of the modules within the stack fails. In other words, one or more failed modules may be replaced/serviced independent of the other modules. The proposed stack of capacitive energy modules allows the modules that have failed to be repaired/replaced while the remaining modules within the stack are reused. Although some of the embodiments described herein describe the use of modules in an X-ray generating device, in other embodiments, the modules may be used in other devices such as electron beam generating devices.

It is appreciated that certain applications may need higher X-ray dose, e.g., for deeper penetration into objects being imaged, while other applications require more dose on target, e.g., for radiation effects characterization. Applications such as these may need an increase in output capacity of the stack of capacitive energy modules. Accordingly, replacing the capacitive energy modules with higher capacity modules, as needed, enables the stack to be used even for higher output applications, e.g., a stack of 70-74 modules may be used to generate 25%-30% more X-ray dose, while retaining the same form factor as the conventional system. Alternatively, higher capacity modules may be used to shorten the length of the stack of capacitive energy modules, thus reducing the form factor of the entire X-ray generating device, e.g., a stack of 55-60 modules may be used to output the same level of X-ray dose as 80 modules of the conventional system. In some embodiments, higher output may also be achieved by using a two-stage electrode within a given capacitive energy module. For example, within the same capacitive energy module two pairs of electrodes may be used where a first set of capacitive energy components (i.e., first stage) are connected to one another through a top and a bottom connection that discharge first before causing a second set of capacitive energy components (i.e., second stage) that are connected to one another through another top and bottom connection to discharge second. Once the second set of capacitive energy components discharge, the result is output from the capacitive energy module and input to a next capacitive energy module in the stack. As such, the output results in an increased voltage output in comparison to a single staged electrode module.

In order to improve the efficiency (by causing discharge to occur in the correct sequence), in some embodiments, the electrodes in each capacitive energy module are positioned in a ladder configuration as opposed to linear configuration. In the ladder configuration the distance between adjacent electrode pairs is less than the distance between adjacent electrode pairs that are in a linear configuration. As such, it is ensured that adjacent electrode pairs discharge in sequence prior to causing the next capacitive energy module to discharge. As such, the output efficiency of the stack of capacitive energy modules is increased.

Each capacitive energy module may include a tray for housing the capacitive energy components that are connected to one another using a plate or connector (top and bottom) to enable the capacitive energy components to charge in parallel and discharge simultaneously (i.e., in series) to generate high energy output. According to some embodiments, the top and the bottom connectors that electrically connect the capacitive energy components to their respective polarity may be positioned in an offset position with respect to one another, therefore reducing the likelihood of accidental breakdown of dielectric medium, e.g., air, between the plates, by increasing the distance between the edges of the plates in comparison to the no offset configuration. It is appreciated that the increase in the distance between the edges of the top and bottom plates with respect to one another reduces arcing between the top plate and the bottom plate as they are held at opposite high voltage polarities.

It is appreciated that in one aspect of the present embodiments the capacitive energy components of each module are connected to two electrodes rather than four electrodes of the conventional system. It is appreciated that the modules are connected to one another to form a stack of capacitive energy modules using plugs connectors that makes a solid contact as opposed to spring loaded contacts of the conventional device. It is appreciated that in some embodiments, high wattage resistors are used in the electrical charging and discharging path instead of bare, thin wire inductors that are used in the conventional system and are better suited than the inductors to withstand the reflection due to impedance mismatch caused by changing length of the output anode-cathode gap.

Figure 1B:
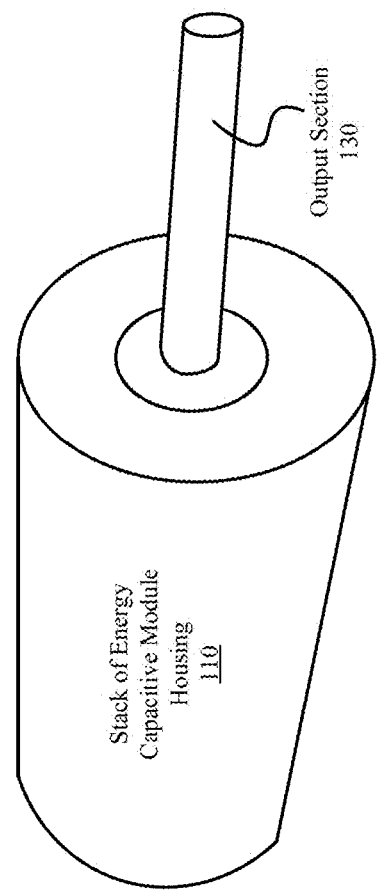
FIG. 1B depicts an example of a housing for capacitive energy modules connected to an output section according to one aspect of the present embodiments.

Referring now to FIG. 1A, an example of a housing 110 for capacitive energy modules according to one aspect of the present embodiments is shown. In some embodiments, the stack of capacitive energy module housing 110 may be cylindrical in shape having an output 120. According to some embodiments, the housing 110 is configured to house a set of capacitive energy modules. It is appreciated that the housing 110 is shown and described as being cylindrical for illustrative purposes and should not be construed as limiting the scope of the embodiments. For example, a rectangular shape housing may also be used. Referring now to FIG. 1B, an example of a housing for capacitive energy modules 100 connected to an output section 130 according to one aspect of the present embodiments is shown. In this embodiment, the output 120 is connected to the output section 130. When the energy from the stack of modules in housing 110 is coupled to the output section 130, X-rays are generated towards the target (not shown).

Figure 2:
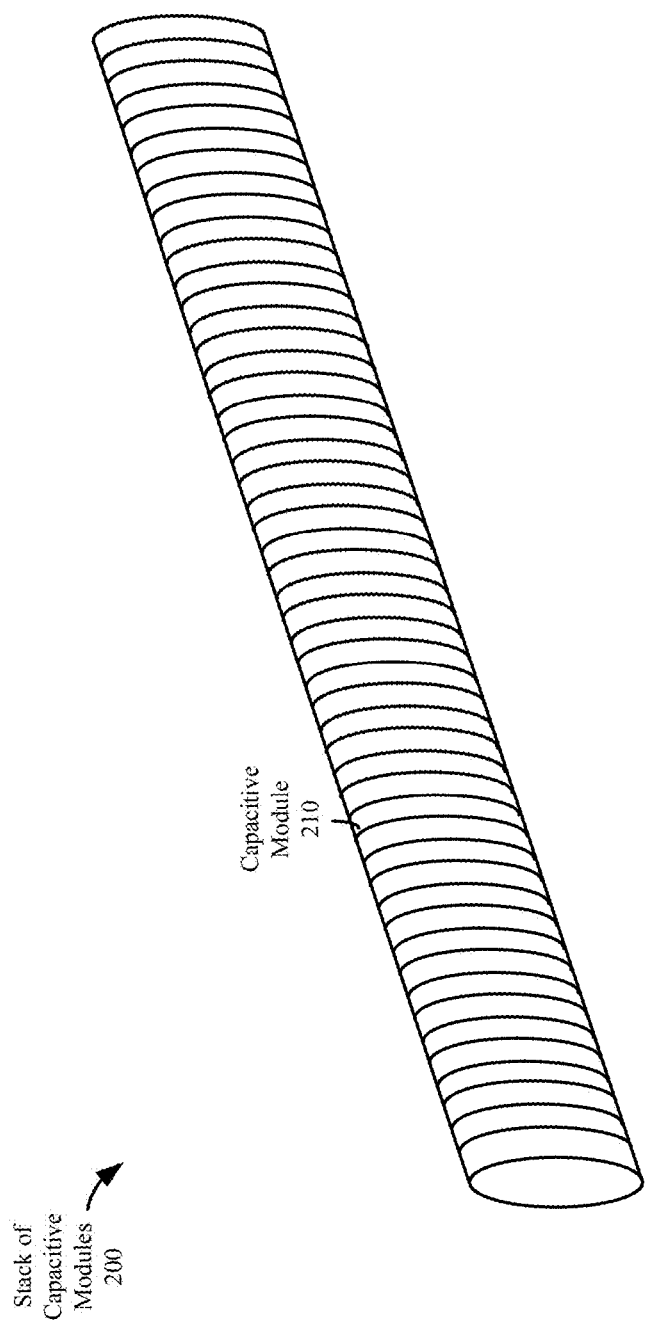
FIG. 2 depicts a plurality of capacitive modules according to one aspect of the present embodiments.

Referring now to FIG. 2, a plurality of capacitive modules 210 according to one aspect of the present embodiments is shown. A stack of capacitive modules 200 may include a plurality of capacitive modules 210, as shown. The number of capacitive modules 210 may differ from one application to the next. For example, 70-74 capacitive modules 210 may be stacked together in a 2.4 MV pulsed power machine, in some embodiments.

Referring now to FIG. 3, an example of a housing 110 with a stack of capacitive energy modules 200 according to one aspect of the present embodiments is shown. The stack of capacitive modules 200 are housed within the module housing 110. As illustrated the stack 200 is shown outside the housing 110 for clarity.

Figure 4B:
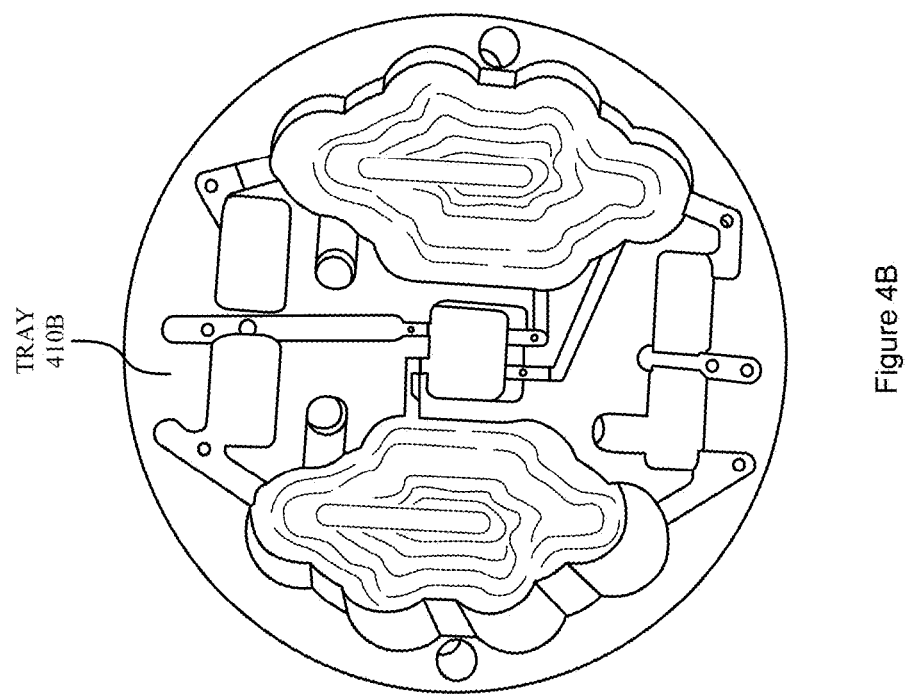
FIGS. 4A-4B shows examples of trays configured to house one or more capacitive energy components according to aspects of the present embodiments.
Figure 4A:
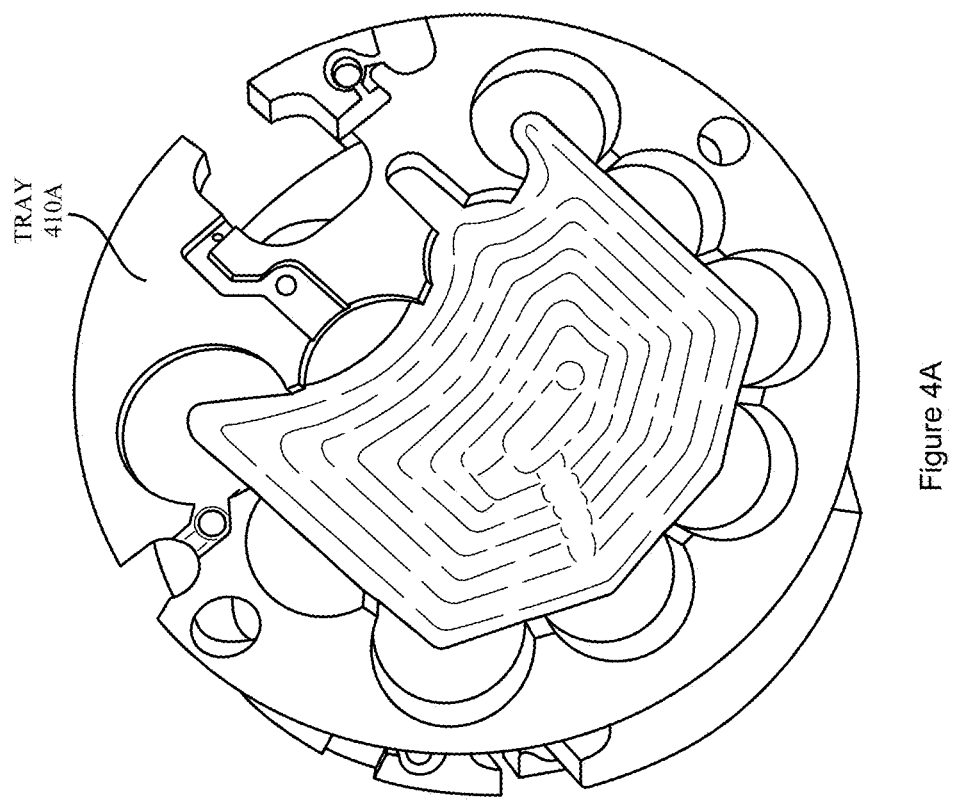

Referring now to FIG. 4A, an example of a tray 410A configured to house one or more energy capacitive components according to one aspect of the present embodiments is shown. The tray 410 may be manufactured from any suitable plastic material, a non-limiting example including Delrin® (an acetal homopolymer) or Acrylonitrile Butadiene Styrene (ABS), for ease of machining and excellent electrical insulating characteristics. Various components of the module may be assembled within the tray 410A. The tray 410A may include a plurality of recesses/pockets machined for housing each capacitive energy component, e.g., capacitor. The tray 410A may also include certain indentations for placement of electrodes where the capacitors are connected thereto. The tray 410A may further include indentation/housing to place the plug or connector for connecting one module of the stack to the next.

Referring now to FIG. 4B, a tray 410B configured to house one or more energy capacitive components according to one aspect of the present embodiments is shown. It is appreciated that the tray 410B is similar to that of FIG. 4A except that the tray 410B is used for two-stage capacitive energy module (described later below).

Figure 5A:
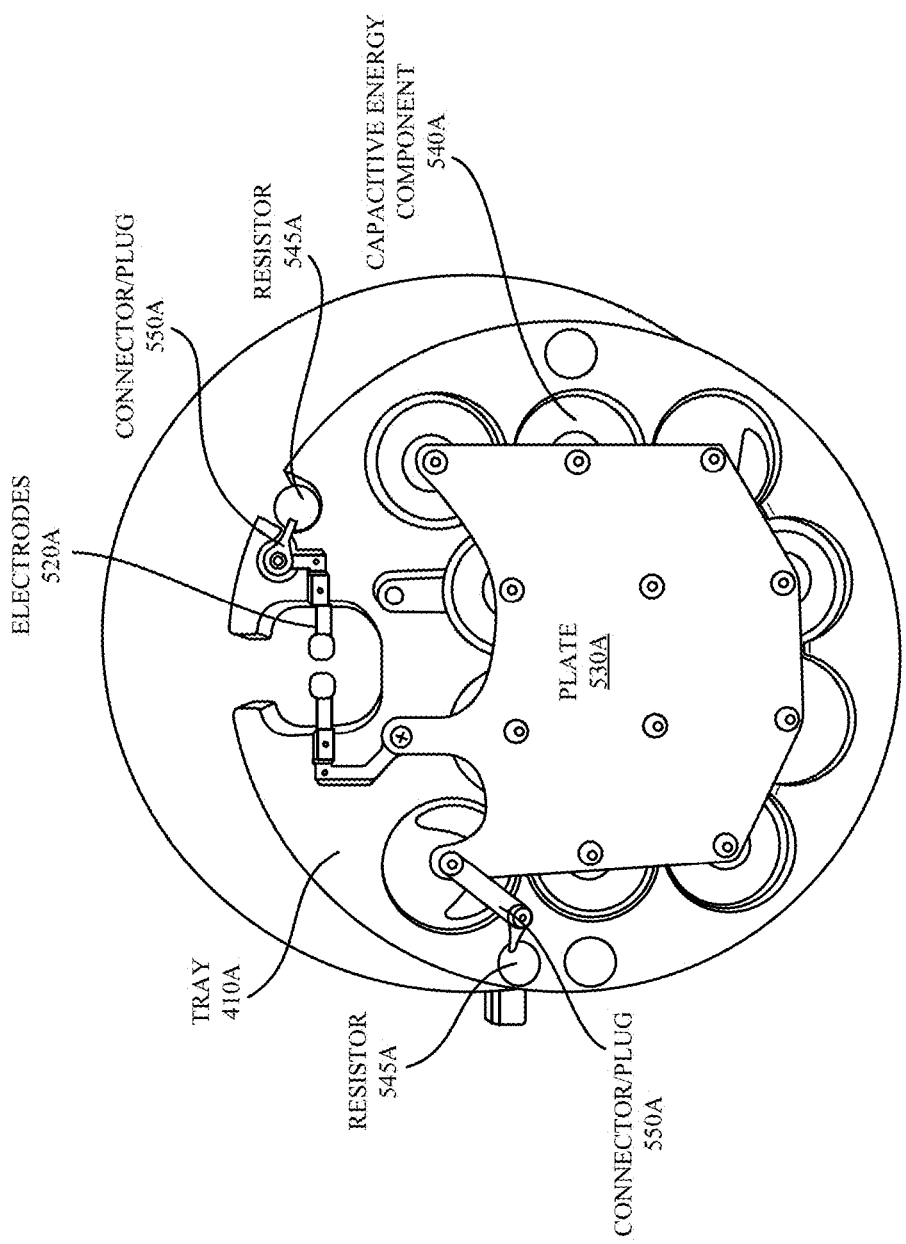
FIGS. 5A-5B show examples of capacitive energy modules with plate connections according to aspects of the present embodiments.

Referring now to FIG. 5A, an example of a capacitive energy module according to one aspect of the present embodiments is shown. In this nonlimiting example, the tray 410A may be used to assemble various components within. For example, in this embodiment, 12 capacitive energy components 540A, e.g., capacitors, may be housed within the tray 410A. It is appreciated that the capacitive energy components 540A are connected to one another by two plates 530A (i.e., a top plate for making electrical connection for one polarity and a bottom plate for making electrical connection for the opposite polarity) connected on either side of the capacitive energy components 540A. In this nonlimiting example, the plates 530A (top and bottom) are positioned to aligned with respect to one another. The plates 530A provide the charging and discharging path for the energy in capacitive energy components 540A. The plates 530A may be brass plates. It is appreciated that the use of the plate 530A is for illustration purposes only and should not be construed as limiting the scope of the embodiments. For example, finger connectors, e.g., brass finger connectors, may be used to make the electrical connection for charging and discharging.

It is appreciated that the capacitive energy components 540A may be coupled to electrodes 520A (only two in this nonlimiting example as opposed to four electrodes in the conventional device). It is appreciated that the energy output from the capacitive energy components 540A is output through the electrodes 520A. It is further appreciated that in some embodiments, high wattage resistors 545A are used instead of thin, bare wire inductors of the conventional device. The high wattage resistors are used for charging and discharging and better suited to withstand the reflections due to impedance mismatch than thin bare-wire inductors in the conventional system.

It is appreciated that each capacitive energy module may be connected to another module using plugs/connectors 550A. The plugs/connectors 550A makes solid contact between the modules as opposed to spring loaded contact in the conventional system that may jam and cause electrical arcing leading to corrosion and pitting over time. The table below shows some nonlimiting examples of the parameters associated with the proposed module of some embodiments in comparison to the conventional module.

Figure 5B:
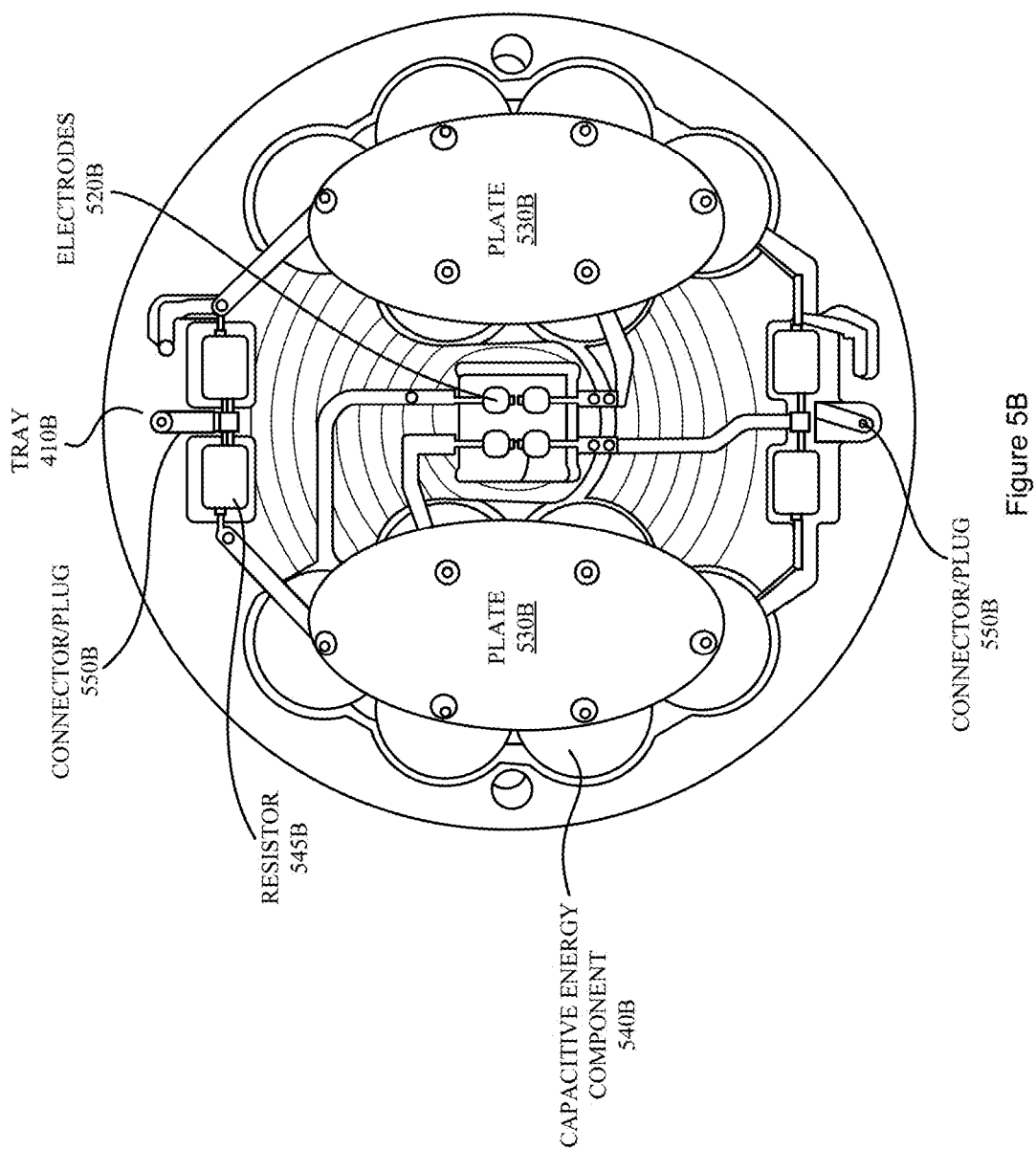

Referring now to FIG. 5B, an example of a two-stage capacitive energy module according to one of the present embodiments is shown. In this nonlimiting example, the tray 410B may be used to assemble various components within. This nonlimiting example shows that two sets of 6 capacitive energy components 540B each can be housed within a tray 410B. Each set of 6 capacitive energy components are connected to each other with plates 530B (i.e., a top plate for making electrical connection for one polarity and a bottom plate for making electrical connection for the opposite polarity) connected on either side of the capacitive energy components 540B, in this nonlimiting example, the plates may be brass plates. It is appreciated that the top plate and bottom plate may be offset from each other, in this nonlimiting example. It is appreciated that the use of the plate 530B is for illustration purposes only and should not be construed as limiting the scope of the embodiments. In other embodiments, the plates may be replaced by strips, for example. In some embodiments, finger connectors, e.g., brass finger connectors, may be used to make the electrical connection for charging and discharging. The top plate and bottom plate are connected to opposite polarities. Each set of 6 capacitive energy components 540B may be coupled to two electrodes 520B. It is further appreciated that the energy output from one set of 6 capacitive energy components 540B is output through one pair of electrodes 520B and the energy output from the second set of 6 capacitive energy components 540B is output from the second pair of electrodes 520B, thus doubling the energy output in this nonlimiting example of a two-stage capacitive energy module. It is further appreciated that in some embodiments, high wattage resistors 545B are used instead of thin, bare wire inductors of the conventional device. The high wattage resistors are used for charging and discharging and better suited to withstand the reflections due to impedance mismatch than thin bare-wire inductors in the conventional system.

It is appreciated that each capacitive energy module may be connected to another module using plugs/connectors 550B. The plugs/connectors 550B makes solid contact between the modules as opposed to spring loaded contact in the conventional system that may jam and cause electrical arcing leading to corrosion and pitting over time. The table below shows some nonlimiting examples of the parameters associated with the proposed module of some embodiments in comparison to the conventional module.

| Parameter | Conventional Module | Proposed Module |
|---|---|---|
| Number of Marx stages per module | 2 | 1 or 2 |
| Number of capacitors per module | 8 (4 per stage) | 12 (in 1 stage or 2 × 6 in 2 stage) |
| Rated voltage of each capacitor | 30 [kV] | 50 [kV] |
| Rated capacitance of each capacitor | 2300 [pF] | 2100 [pF] |
| Energy stored per module | 8.3 [J] at 30 [kV] | 31.5 [J] at 50 [kV] |
| Form factor | 1.25 inch thick | 1.4 inch thick |
| Number of modules in one 2.3 MV | 80 | 65-70 (estimated) |

It is also appreciated that 6 (six) proposed capacitive energy modules were tested for X-ray dose by connecting their output to an anode-cathode gap in vacuum for illustrative purposes that should not be construed as limiting the scope of the embodiments. The anode was a 2.4 mm diameter tungsten needle and the cathode was a 9 mm diameter annulus. Each stage of the module was charged to 40 kV and the dose output was monitored with an ion chamber at 1 meter distance away from the cathode plane. Below is a table illustrating the test measurements for illustrative purposes only. The values given under the "Dose (millirad)" column, as shown below, correspond to X-ray output dose measurements as the distance between the node and cathode, i.e., the "A-K gap" increases as the needle erodes. The initial and final values of the A-K gap, in millimeters, is shown in the column labeled "A-K gap". Each needle eventually wore out and had to be replaced. As such, multiple set of columns are shown for dose measurement with replacement needles. All needles used were identical in shape and size for illustration purposes only.

Dose Measurements Using Six Proposed Modules in an X-Ray Device

| Needle 1 | | | Needle 2 | | | Needle 3 | | |
|---|---|---|---|---|---|---|---|---|
| File # | Dose (mrad) | A-K gap | File # | Dose (mrad) | A-K gap | File # | Dose (mrad) | A-K gap |
| 73 | 4.5 | 0 mm | 80 | 7.46 | 2 33 | 91 | 6.21 | 3 mm |
| 74 | 6.44 | \| | 81 | 7.24 | \| | 92 | 7.4 | \| |
| 75 | 9.46 | \| | 82 | 5.65 | \| | 93 | 5.77 | \| |
| 76 | 7.95 | \| | 83 | 7.54 | \| | 94 | 9.76 | \| |
| 77 | 7.28 | \| | 84 | 7.61 | \| | 95 | 9.46 | \| |
| 78 | 7.1 | ↓ | 85 | 5.87 | \| | 96 | *** | \| |
| 79 | 7.53 | 3 mm | 86 | 8.44 | \| | 97 | *** | \| |
| | | | 87 | 9.06 | \| | 98 | 8.44 | \| |
| | | | 88 | 7.19 | \| | 99 | 8.9 | \| |
| | | | 89 | 6.07 | ↓ | 100 | 10.4 | \| |
| | | | 90 | 7.51 | 7 mm | 101 | *** | \| |
| | | | | | | 102 | *** | \| |
| | | | | | | 103 | 9.21 | \| |
| | | | | | | 104 | 9.75 | \| |
| | | | | | | 105 | 6.84 | ↓ |
| | | | | | | 106 | 8.56 | 8 mm |

It is appreciated that the results of testing of 6 (six) conventional capacitive energy modules in the same X-ray device are also shown below for comparison. It is appreciated that the anode and cathode were similar to the previous tests with the proposed module.

Dose Measurements Using Six Conventional Modules in an X-Ray Device

| Needle 1 | | | Needle 2 | | |
|---|---|---|---|---|---|
| File # | Dose (mrad) | A-K gap | File # | Dose (mrad) | A-K gap |
| 0 | 7.15 | 0 mm | 16 | 3.3 | 0 mm |
| 1 | 6.27 | \| | 17 | 6 | \| |
| 2 | 6.26 | \| | 18 | 6.1 | \| |
| 3 | 6.22 | \| | 19 | 6.02 | \| |
| 4 | 6.12 | \| | 20 | 5.8 | \| pf |
| 5 | 6.23 | \| | 21 | 5.71 | \| |
| 6 | 6.01 | \| | 22 | 5.73 | \| |
| 7 | 5.9 | \| | 23 | 6.06 | \| |
| 8 | 5.17 | \| | 24 | 5.35 | \| |
| 9 | 5.78 | \| | 25 | 5.64 | \| |
| 10 | *** | \| | 26 | 5.62 | \| |
| 11 | 5.3 | \| | 27 | 5.38 | \| |
| 12 | 5.28 | \| | 28 | 5.27 | \| |
| 13 | 5.22 | \| | 29 | 5.22 | \| |
| 14 | 5.27 | ↓ | 30 | 5.43 | \| |
| 15 | 5.17 | 3 mm | 31 | 5.25 | \| |
| | | | 32 | 5.2 | \| |
| | | | 33 | 5.14 | \| |
| | | | 34 | 4.88 | \| |
| | | | 35 | 4.95 | \| |
| | | | 36 | 4.83 | \| |
| | | | 37 | 4.73 | ↓ |
| | | | 38 | 4.03 | 3 mm pf |

It is appreciated that since the assembly in embodiments is not epoxied, each component within the capacitive energy module may be serviced, repaired and replaced without having to replace the entire module. It is appreciated that using plates 530A or 530B for example for making the electrical connections for polarities of the capacitive energy components 540A or 540B results in a robust electrical connection, lower time lag (instantaneous discharge), and lower inductance in comparison to other types of connections, e.g., strip connection (discussed in FIGS. 7A and 7B). It is appreciated that in some embodiments, the plates 530A and/or 540B may be electrical connected to the capacitive energy components 540A and/or 540B using screws or a similar attachment mechanism. As such, various components in the capacitive energy module may be disassembled, serviced/repaired, or replaced without having to replace the entire module because various components are assembled in a detachable manner (can be taken apart for example by unscrewing). It is further appreciated that each capacitive energy module (as shown in FIGS. 5A/5B) serves as a cover for its adjacent capacitive energy module. In other words, removing one capacitive energy module exposes the adjacent capacitive energy module that was previously covered with the capacitive energy module that is removed, enabling each capacitive energy module to be serviceable/repairable/replaceable.

Figure 6A:
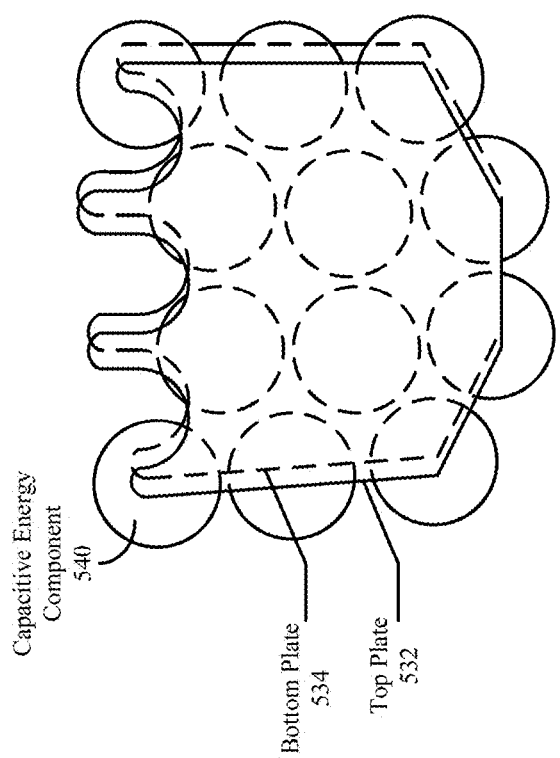
FIGS. 6A-6C, show examples of top and bottom plates in offset configuration according to one aspect of the present embodiments.
Figure 6C:
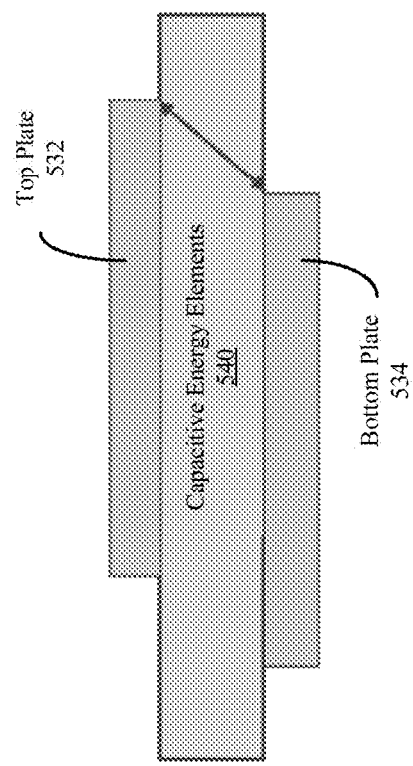
Figure 6B:
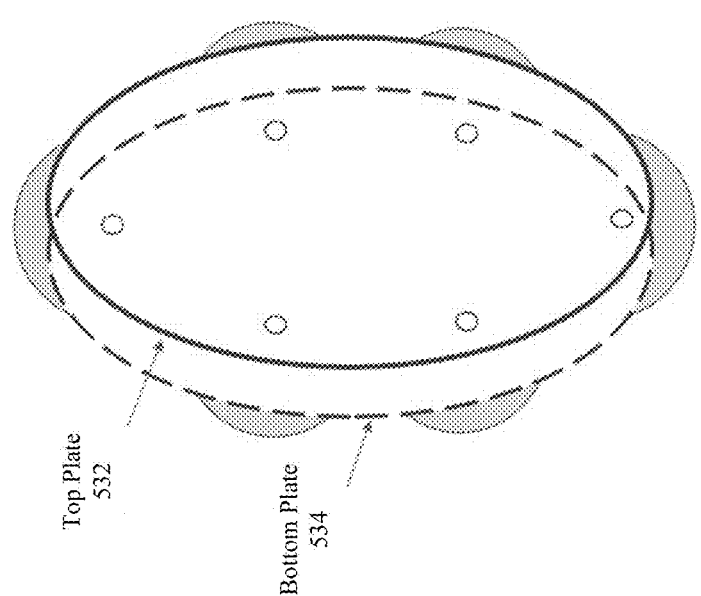

Referring now to FIGS. 6A and 6B, a top view of a capacitive energy module according to one aspect of the embodiments is shown. In FIG. 6A, similar to FIG. 5A, 12 capacitive energy components 540 are used whereas in FIG. 6B, similar to FIG. 5B, 6 capacitive energy components 540 are used. One polarity of the capacitive energy components 540 is electrically connected using a top plate 532 (similar to plate 530A/530B) and the opposite polarity of the capacitive energy components 540 is electrically connected using a bottom plate 534 (similar to plate 530A/530B). It is appreciated that in this embodiment, the top plate 532 and the bottom plate 534 are offset with respect to one another. Offsetting the top plate 532 from the bottom plate 534 increases the distance between the edges of the top and bottom plates 532 and 534 respectively, as shown in FIG. 6C. It is appreciated that increasing the distance, as illustrated by offsetting the plates 532 and 534 with respect to one another, reduces arcing between the top plate 532 and the bottom plate 534 as they are held at opposite high voltage polarities. Moreover, increasing the distance between the two plates prevents accidental breakdown of the dielectric medium, e.g., air, that is in between the plates. In other words, the top and the bottom plates may be identical in shape but positioned in a staggered configuration with respect to one another within the same capacitive energy module. It is appreciated that increasing the distance is directly proportional to the high voltage stand-off between the plates, thereby reducing the chance of accidental electrical breakdown of the dielectric medium between the two plates, e.g., air in this case.

Figure 7A:
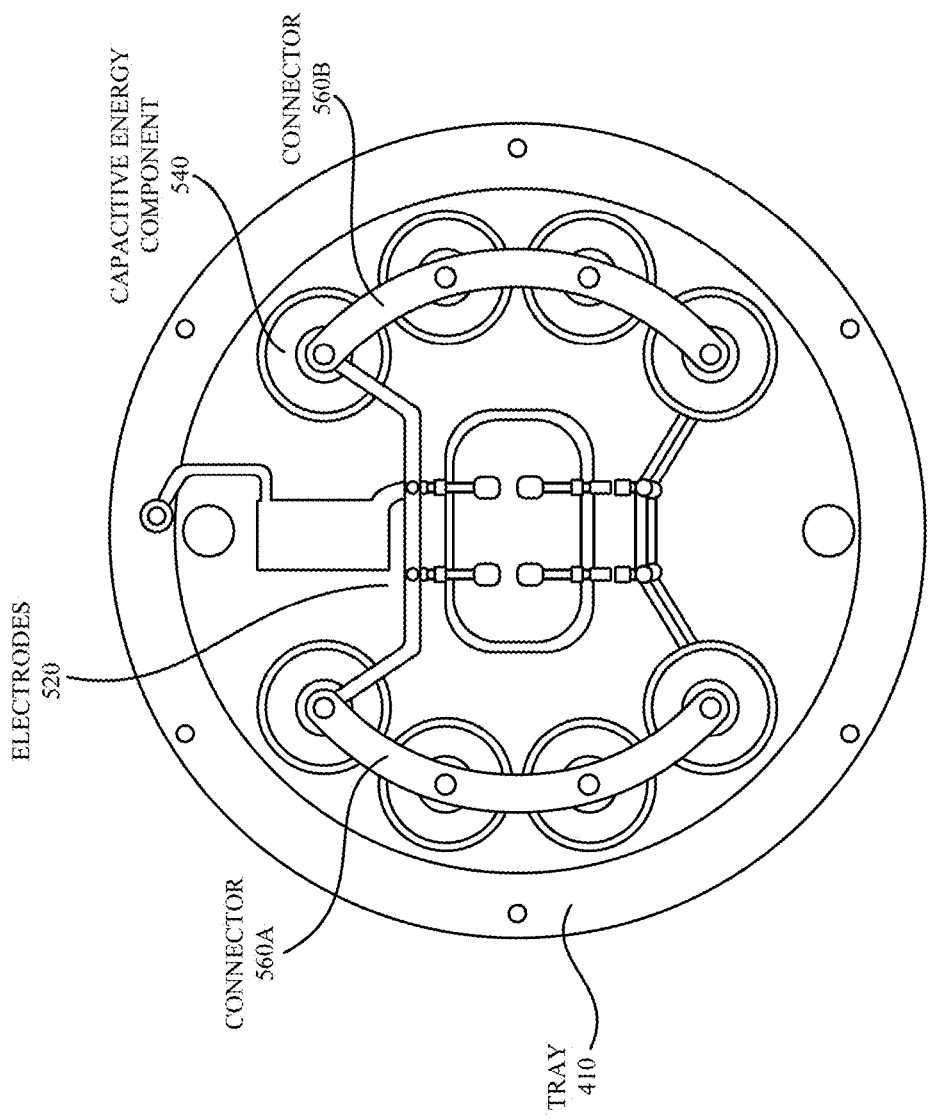
FIG. 7A shows an example of a capacitive energy module with strip connectors according to one aspect of the present embodiments.

Referring now to FIG. 7A, an alternative embodiments of capacitive energy module according to one aspect of the present embodiments is shown. FIG. 7A is substantially similar to that of FIG. 5B where two stage electrodes are used. The two-staged electrode and operation thereof is described in great detail in FIG. 9. In this embodiment instead of using two plates 530 (as shown in FIG. 5B) to connect the capacitive energy components 540, four connectors 560A and 560B (top connectors) are used (two on top as shown and two on the bottom not shown). The connectors 560 may be referred to as strip connectors because they are configured as a strip rather than a plate. The connector 560A and its bottom connector (not shown) connects the first stage of the capacitive energy components 540 to the first set of two electrodes 520 while the connector 560B connects the second stage of the capacitive energy components 540 to the second set of two electrodes 520. In this example, the top connector 560A and its bottom connector (not shown) cause the four capacitive energy components 540 that they are connected to discharge first through the first pair of electrodes causing the connector 560B and its corresponding bottom connector (not shown) to cause the capacitive energy components 540 that they connect to discharge to the next capacitive energy module (described in greater detail in FIG. 9). It is appreciated that FIG. 7A shows the top capacitive energy module that is adjacent the rest of the modules that form the stack as shown in FIG. 7B. It is further appreciated that FIG. 7A may include the proposed capacitive energy module in this one aspect of the embodiment having four electrodes (two sets of two) in a 'ladder configuration' or 'linear configuration' of the four electrodes (two sets of two). The ladder configuration is described in great detail in FIGS. 8A-8B.

It is appreciated that the capacitive energy modules, as described above, regardless of whether a single staged electrodes are used or two-staged electrodes, whether a plate is used or a strip connector is used to connect the capacitive energy components, etc., may use banana plugs and jacks for electrical connections to connect the capacitive energy modules to one another. Moreover, the capacitive energy modules may use high wattage resistors, as described above.

Figure 8A:
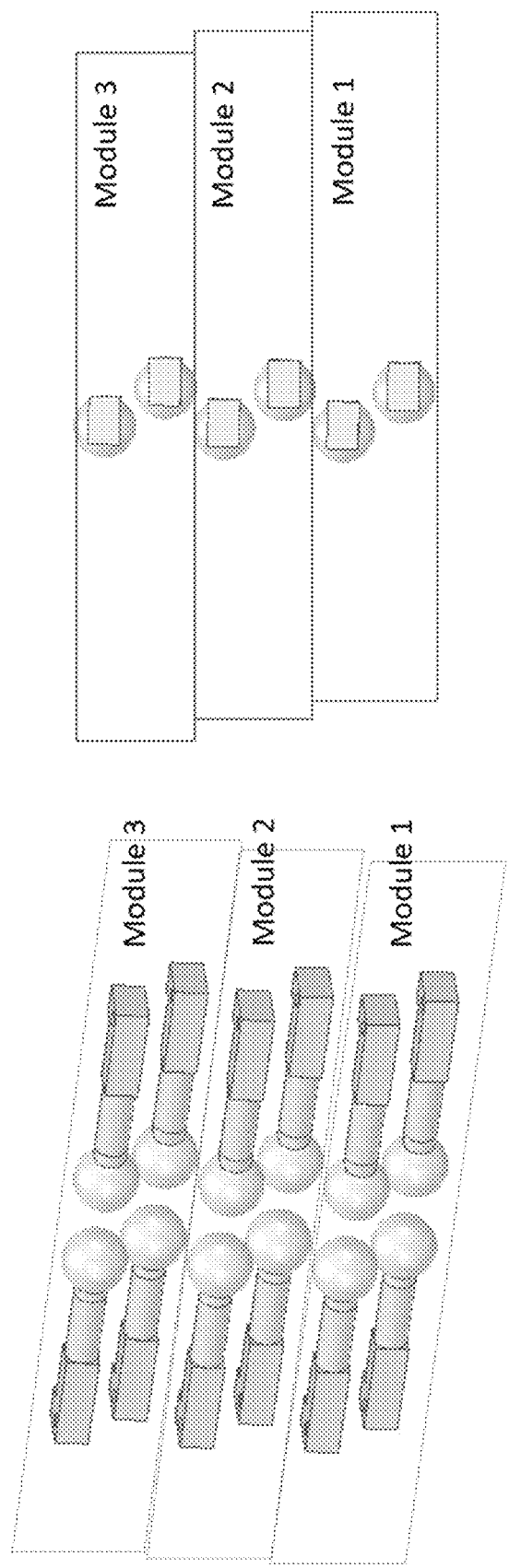
FIGS. 8A-8B show examples of 'ladder configuration' for the electrodes of the modules and their respective discharge path according to one aspect of the present embodiments.
Figure 8B:
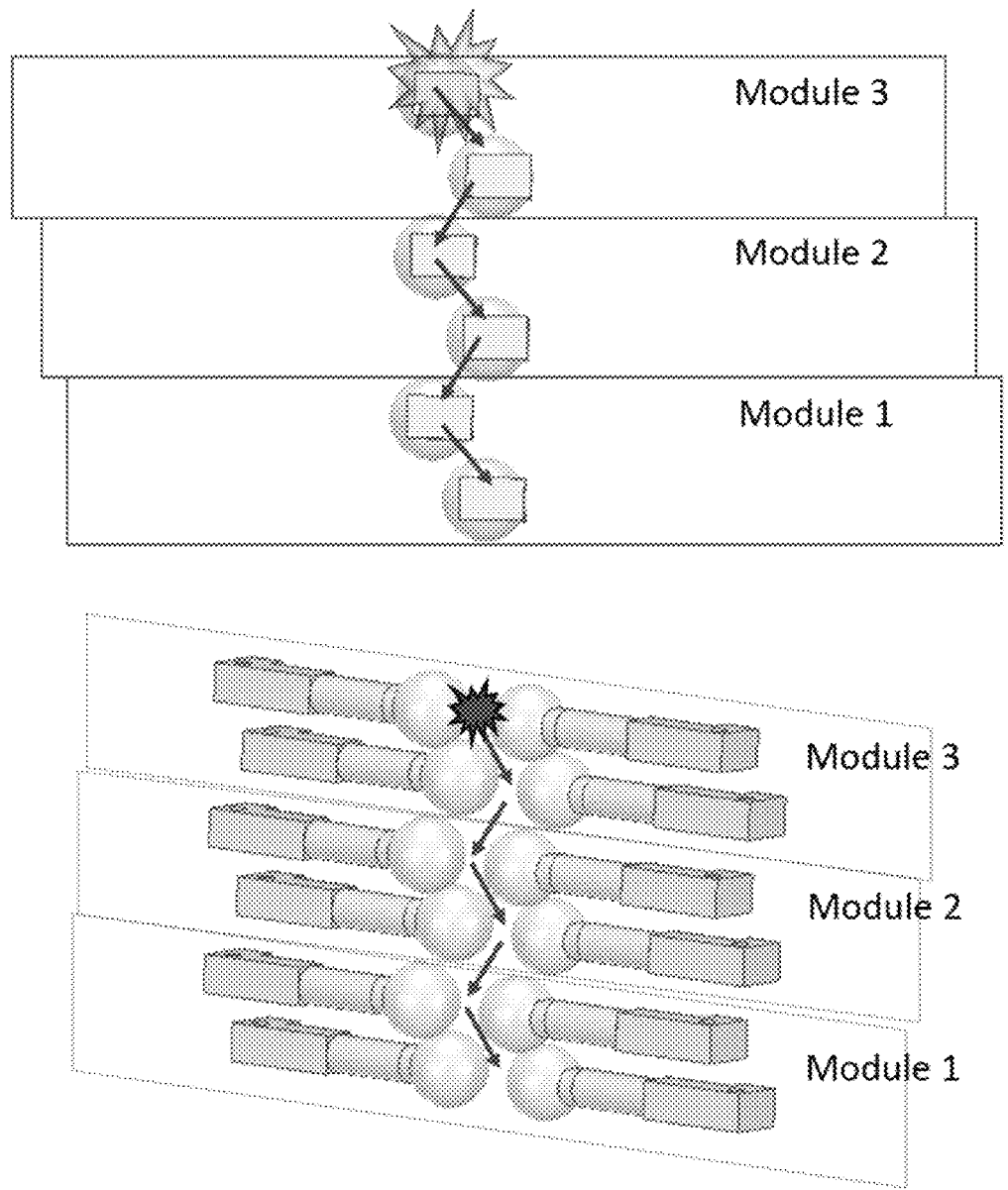

Referring now to FIGS. 8A and 8B, a ladder configuration of a two-staged electrode according to some embodiments is shown. It is appreciated that this 'ladder configuration' may be more efficient in the discharge process of the energy from the stack of capacitive energy modules. FIG. 8A illustrates the 'ladder configuration' of the electrodes while FIG. 8B illustrates the discharge path for FIG. 8A for illustrative purposes. It is appreciated that only 3 modules are shown in FIGS. 8A-8B for illustrative purposes and that any number of modules may be present. In order to improve the efficiency (by causing discharge to occur in the correct sequence), in some embodiments, the electrodes in each capacitive energy module are positioned in a ladder configuration as opposed to linear configuration. In ladder configuration the pairs of electrodes are not within the same plane (i.e., not coplanar) but rather are on different planes creating the ladder configuration. In the ladder configuration the distance between adjacent electrode pairs is less than the distance between adjacent electrode pairs in linear configuration. As such, it is ensured that adjacent electrode pairs discharge in sequence prior to causing the next capacitive energy module to discharge. For example, the top pair of electrodes in module 3 discharges first followed by the second pair of electrodes after which the discharge causes the first pair of electrodes in module 2 to discharge followed by the second pair of electrodes in module 2 and a similar process continues with module 1 and beyond. As such, the output efficiency of the stack of capacitive energy modules is increased. One of the advantages of the ladder configuration for the electrodes is to ensure that adjacent stages in a stack of capacitive energy modules discharge their energies in a consecutive manner, i.e., without skipping intermediate stages. The linear configuration may be allowing non-consecutive stages to discharge out of sequence, thereby reducing output efficiency. Moreover, the distance between the adjacent electrode pairs in ladder configuration is less than the distance between adjacent electrode pairs in the linear configuration that further ensures consecutive discharge within each module.

Figure 9:
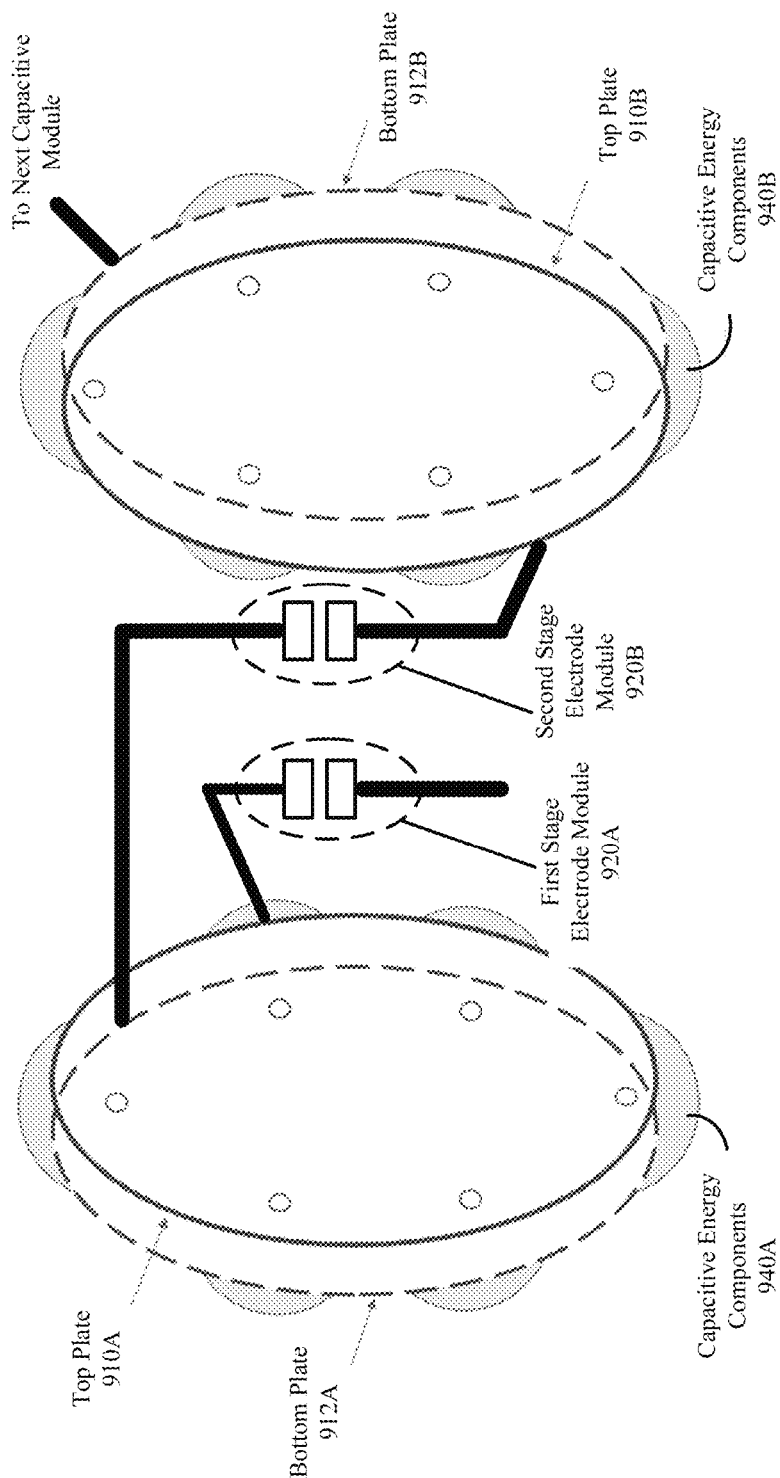
FIG. 9 shows a two-stage electrode within a given capacitive energy module according to one aspect of the present embodiments.

FIG. 9 shows the operation of a two-staged electrode within a single capacitive energy module according to one aspect of the embodiments is shown. In this nonlimiting example, a top plate 910A (similar to plate 530B) electrically connects the capacitive energy components 940A (similar to capacitive energy components 540B) to one polarity while a bottom plate 912A (similar to plate 530B) electrically connects the capacitive energy components 940A to its opposite polarity. It is appreciated that a first stage electrode module 920A (comprising a pair of electrodes) may be connected to the top plate 910A. It is appreciated that the top plate 910A, the bottom plate 912A, the capacitive energy components 940A, and the first stage electrode module 920A may form a first stage of the two-staged electrode within a single capacitive energy module. Similarly, a top plate 910B (similar to plate 530B) electrically connects the capacitive energy components 940B (similar to capacitive energy components 540B) to one polarity while a bottom plate 912B (similar to plate 530B) electrically connects the capacitive energy components 940B to its opposite polarity. It is appreciated that a second stage electrode module 920B (comprising a pair of electrodes) may be connected to the top plate 910B. It is appreciated that the top plate 910B, the bottom plate 912B, the capacitive energy components 940B, and the second stage electrode module 920B may form a second stage of the two-staged electrode within a single capacitive energy module. It is appreciated that in this embodiment, the plates are shown in an offset configuration (as described above) for illustrative purposes and should not be construed as limiting the scope of the embodiments. For example, a non-offset configuration may be used instead. Moreover, it is appreciated that the connection for the polarities of the capacitive energy components are described with respect to a plate for illustrative purposes only and should not be construed as limiting the scope of the embodiments. For example, a strip connector may be used instead.

In this example, the first stage electrode module 920 causes a discharge of the capacitive energy components 940A. The discharge goes through the bottom plate 912A and to the second stage electrode module 920 connected to the top plate 910B of the capacitive energy components 940B. The discharge from the first stage causes a discharge by the capacitive energy components 940B that goes through the bottom plate 912B and out to the next capacitive module in the stack. As a result, the voltage output is increased in comparison to a single staged electrode module.

Referring now to FIGS. 10A-10B, examples of banana connectors and receptacles are shown in some non-limiting configurations of the present embodiments in comparison to conventional modules for illustrative purposes. It is appreciated that the configuration of the plug and receptacle in adjacent modules have a single geometry, as shown in FIG. 10B, as opposed to a 'left' and 'right' orientation of the conventional module, as shown in FIG. 10A. It is appreciated that this single geometry allows for any damaged module in the stack to be replaced with a new module. Moreover, it is appreciated that only 4 modules are shown in FIGS. 10A-10B for illustrative purposes and that any number of modules may be present.

Figure 11D:
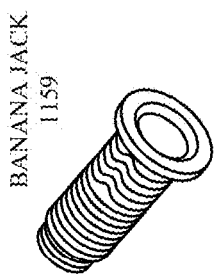
FIGS. 11A-11F depict examples of connectors for connecting capacitive energy modules to one another according to some nonlimiting embodiments.
Figure 11C:
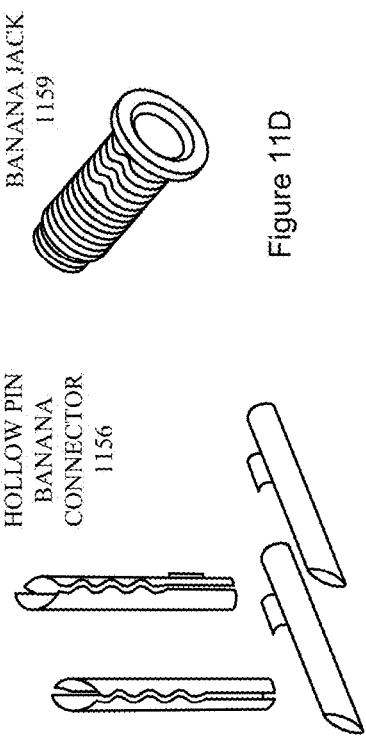
Figure 11B:
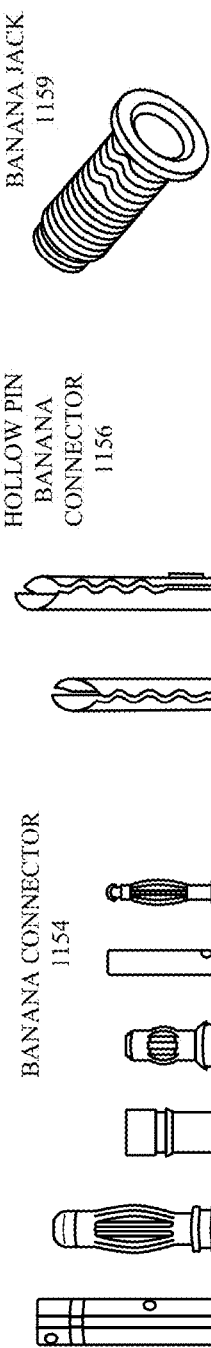
Figure 11A:
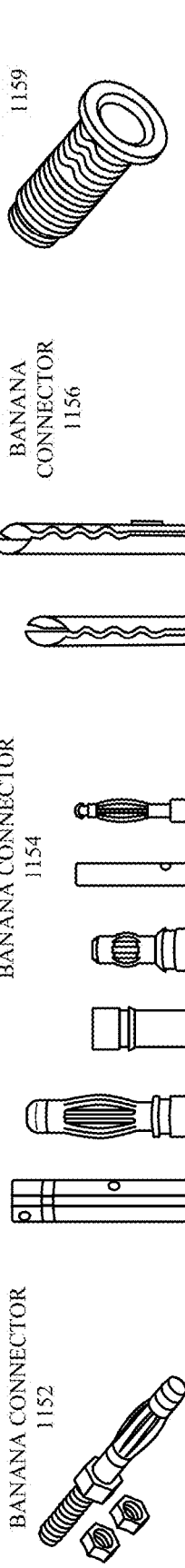
Figure 11F:
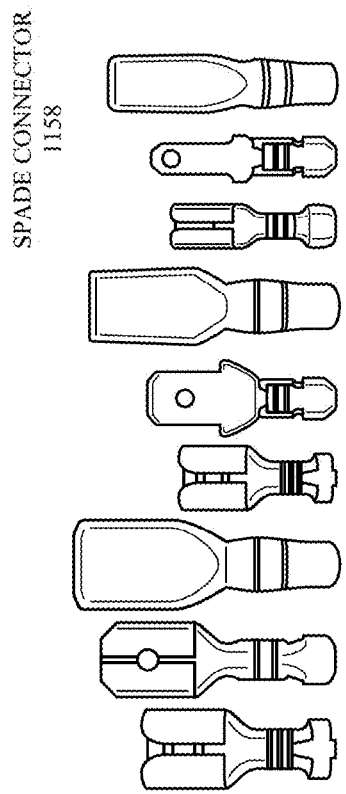
Figure 11E:
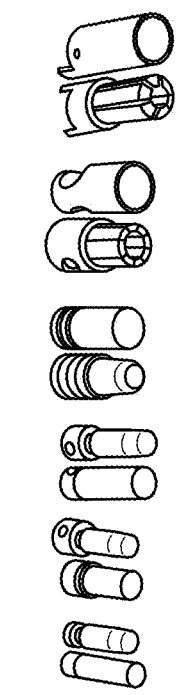

Referring now to FIGS. 11A-11F, examples of connectors for connecting capacitive energy modules to one another according to some non-limiting embodiments are shown. FIG. 11A shows a banana connector 1152 while FIG. 11B shows another banana connector 1154. FIG. 11C shows a hollow pin banana connector 1156 while FIG. 11D shows a banana jack 1159 connector. FIG. 11E shows the bullet connector 1157 while FIG. 11F shows spade connector 1158. It is appreciated that the connectors as shown in FIGS. 11A-11F, may be used to connect one capacitive energy module of the stack to another capacitive energy module of the stack. Moreover, it is appreciated that use of the connectors as shown is for illustrations purposes and should not be construed as limiting the scope of the embodiments. For example, any connector that makes a solid contact may be used instead of a spring loaded contact.

Figure 12B:
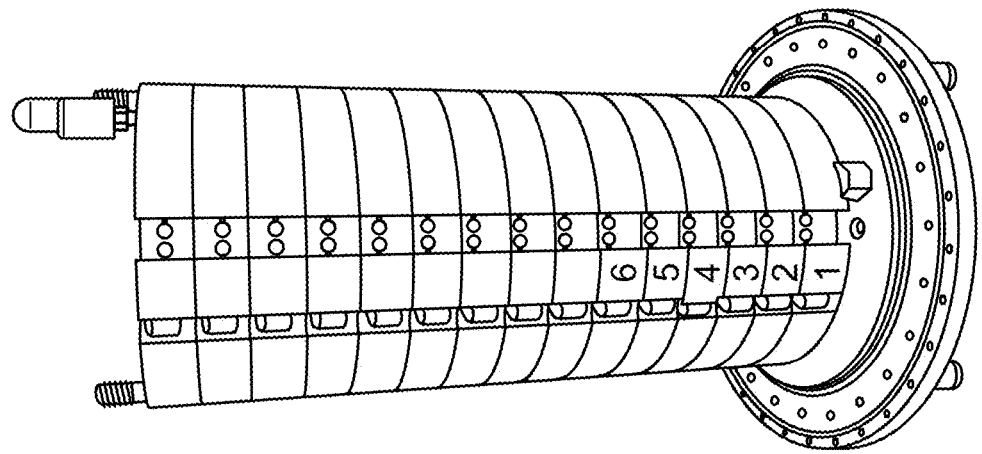
FIGS. 12A-12B show examples of stacked modules according to some of the present embodiments.
Figure 12A:
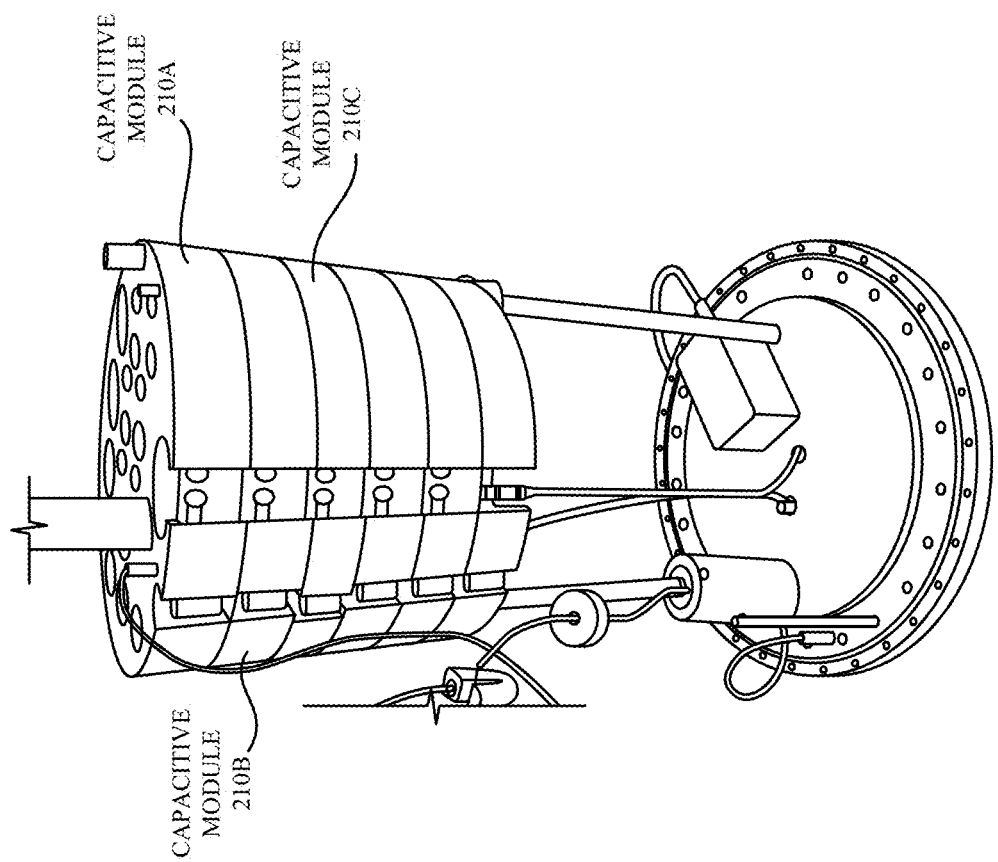

Referring now to FIGS. 12A-12B, examples of stacked modules according to some embodiments are shown. Referring to FIG. 12A, a stack of capacitive modules 210A-C is shown. Referring to FIG. 12B, another stack of capacitive modules is shown. FIG. 12B shows more capacitive energy modules in one stack in comparison to FIG. 12A. As such, if each capacitive energy module is configured to generate the same amount of energy, then in FIG. 12B more energy can be generated and as such can be used for higher X-ray dose allowing for applications that require deeper penetration into objects for imaging. It is further appreciated that the form factor of the X-ray generating device may become smaller by using higher energy generating modules.

It is appreciated that the conventional stack of modules that are epoxied use two orientations between the modules connecting pins and receptacles. As such, in order to make a complete Marx, left and right modules must be stacked alternatingly in order to pass the electrical connections. Thus, when one module fails, e.g., left module, it cannot be replaced with a right module and vice versa. In contrast, the proposed stack of modules use a single design and orientation, thus making each module serviceable and replaceable (i.e., any module can be replaced without regards of its orientation since they all have the same design and orientation).

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A device comprising:
a first capacitive energy module; and
a second capacitive energy module,
wherein the first capacitive energy module comprises a first tray that is configured to house a first plurality of capacitive energy components, a first electrode, and a second electrode,
and wherein the second capacitive energy module comprises a second tray that is configured to house a second plurality of capacitive energy components, a third electrode, and a fourth electrode,
wherein the first capacitive energy module is connected to the second capacitive energy module via a plug connector that makes a solid connection.

2. The device of claim 1 further comprising a housing configured to house the first capacitive energy module and the second capacitive energy module in a stack.

3. The device of claim 2, wherein the housing and the first capacitive energy module and the second capacitive energy module are not epoxied.

4. The device of claim 1, wherein the second capacitive energy module covers an exposed portion of the first capacitive energy module when stacked on top and when the plug connector makes the solid connection.

5. The device of claim 1, wherein the first plurality of capacitive energy components includes a plurality of capacitors.

6. The device of claim 1 further comprising:
a first plate that connects one end of the capacitive energy components of the first plurality of capacitive energy components to one another for a first polarity; and
a second plate that connects another end of the capacitive energy components of the first plurality of capacitive energy components to one another for a second polarity.

7. The device of claim 6, wherein the first plate comprises brass.

8. The device of claim 6, wherein the first plate and the second plate are connected via a detachable connection to the first plurality of capacitive energy component.

9. The device of claim 6, wherein the first plate and the second plate are offset with respect to one another when connected to the capacitive energy components of the first plurality of capacitive energy components.

10. The device of claim 1 further comprising:
a first strip connector that connects one end of the capacitive energy components of the first plurality of capacitive energy components to one another for a first polarity; and
a second strip connector that connects another end of the capacitive energy components of the first plurality of capacitive energy components to one another for a second polarity.

11. The device of claim 10, wherein the first connector and the second connector are connected via a detachable connection to the first plurality of capacitive energy component.

12. The device of claim 1, wherein the plug connector is one of a banana connector, a hollow pin banana connector, a banana jack connector, a bullet connector, or a spade connector.

13. The device of claim 1, wherein energy generated from the first capacitive energy module is output to the second capacitive energy module and wherein the second capacitive energy module outputs a total energy from the first and the second capacitive energy modules to an X-ray generating device.

14. A device comprising:
a first capacitive energy module comprising a first stage output and a second stage output; and a second capacitive energy module stacked and electrically in contact with the first capacitive energy module,
wherein the first stage output discharges a first electrical charge and conducts the first electrical charge to the second stage output, wherein the second stage output in response to receiving the first electrical charge from the first stage output discharges a second electrical charge, and wherein a combined electrical charge based on the first electrical charge and the second electrical charge is conducted out from the first capacitive energy module to the second capacitive energy module.

15. The device of claim 14, wherein
the first stage output includes a first plurality of capacitive energy components, a first pair of electrodes, and a top and a bottom connector associated with the first plurality of capacitive energy components,
the second stage output includes a second plurality of capacitive energy components, a second pair of electrodes, a top and a bottom connector associated with the second plurality of capacitive energy components.

16. The device of claim 15, wherein
the top connector associated with the first plurality of capacitive energy components electrically connects the first plurality of capacitive energy components to first polarity and wherein the bottom connector associated with the first plurality of capacitive energy components electrically connects the first plurality of capacitive energy components to second polarity,
the top connector associated with the second plurality of capacitive energy components electrically connects the second plurality of capacitive energy components to first polarity and wherein the bottom connector associated with the second plurality of capacitive energy components electrically connects the second plurality of capacitive energy components to second polarity.

17. The device of claim 16, wherein the first pair of electrodes causes an electrical discharge by the first plurality of capacitive energy components, wherein the first electrical charges is output from the bottom connector associated with the first plurality of capacitive energy components to the second pair of electrodes.

18. The device of claim 17, wherein the second pair of electrodes causes an electrical discharge by the second plurality of capacitive energy components, wherein the combined electrical charge is output from the bottom connector associated with the second plurality of capacitive energy components to the second capacitive energy module.

19. The device of claim 15, wherein the first pair of electrodes is in ladder configuration with the second pair of electrodes.

20. The device of claim 15, wherein the top connector and the bottom connector associated with the first stage are conductive plates.

21. The device of claim 20, wherein the top connector and the bottom connector are offset with respect to one another.

22. The device of claim 20, wherein the top connector and the bottom connector comprise brass.

23. The device of claim 15, wherein the top and the bottom connector associated with the first plurality of capacitive energy components are connected via a detachable connection to the first plurality of capacitive energy component.

24. The device of claim 14 further comprising a housing configured to house the first capacitive energy module and the second capacitive energy module in a stack.

25. The device of claim 24, wherein the housing and the first capacitive energy module and the second capacitive energy module are not epoxied.

26. The device of claim 14, wherein the second capacitive energy module covers an exposed portion of the first capacitive energy module when stacked on top of one another.

27. The device of claim 14, wherein the first plurality of capacitive energy components includes a plurality of capacitors and wherein the second plurality of capacitive energy components includes a plurality of capacitors.

* * * * *